Dec. 25, 1962
J. E. EDDY
3,069,907
MAGNETIC TYPE CURRENT METER
Filed July 22, 1960
2 Sheets-Sheet 1
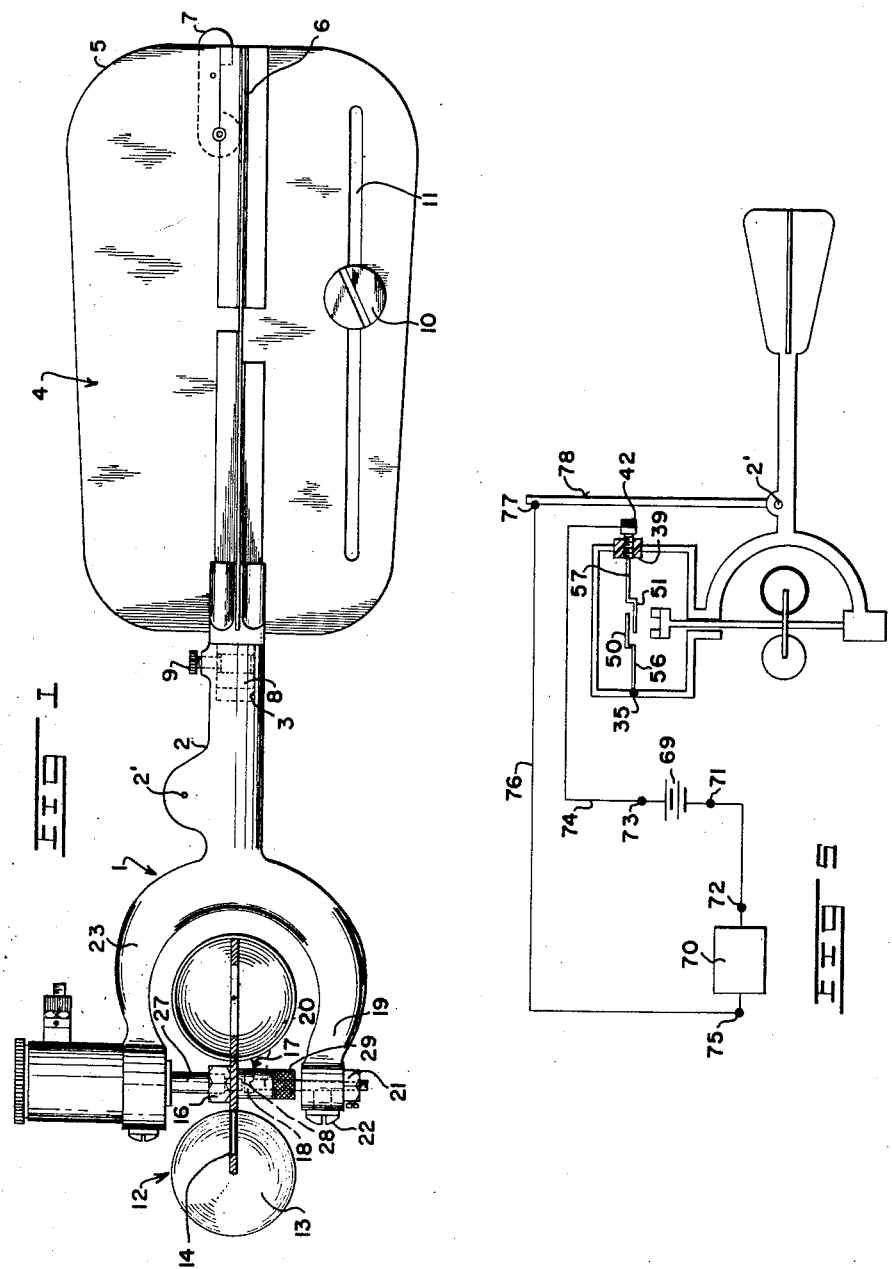
INVENTOR
JAMES E. EDDY
BY
Ernest L. Cohen
Gersten Sadowsky
ATTORNEY Dec. 25, 1962  J. E. EDDY  3,069,907
MAGNETIC TYPE CURRENT METER
Filed July 22, 1960  2 Sheets-Sheet 2
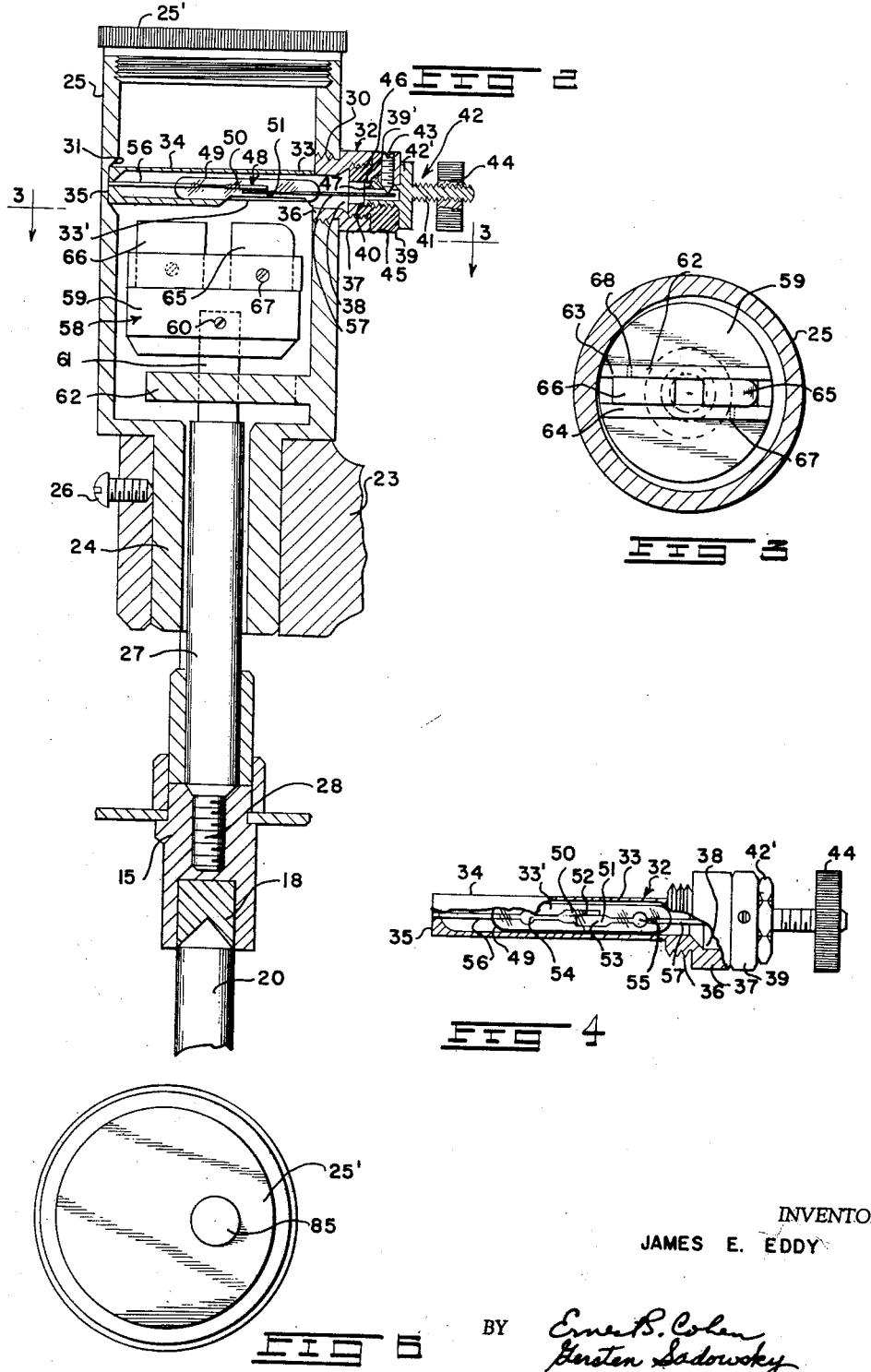
INVENTOR
JAMES E. EDDY
BY Ernest B. Cohen
Gersten Sadowsky
ATTORNEY

United States Patent Office 3,069,907
Patented Dec. 25, 1962

3,069,907
MAGNETIC TYPE CURRENT METER
James E. Eddy, Silver Spring, Md., assignor to the United States of America as represented by the Secretary of the Interior
Filed July 22, 1960, Ser. No. 44,822
11 Claims. (Cl. 73—229)
(Granted under Title 35, U.S. Code (1952), sec. 266)

The invention herein described and claimed may be manufactured and used by or for the Government of the United States of America for governmental purposes without the payment of royalties thereon or therefor.

The invention relates to improvements in current meters used in measuring the discharge or rate of flow of a stream of fluid. A unique magnetically operated rotation sensing arrangement is provided thereby for translating the motion of the meter element driven by the flowing stream, into signals operative to control an indicator. The new and improved simplified construction of the invention results in a more accurate and dependable meter, requiring less maintenance, and having a longer useful life.

An early design for a current meter may be found disclosed in the United States patent to Lallie, No. 914,959, issued March 9, 1909. A detailed description of a modern current meter may be found on pages 173 to 181 of a manual prepared for the Department of the Interior, Geological Survey, titled "Stream-Gaging Procedure (Water Supply Paper 888)" by Don M. Corbett and others, and published by the United States Printing Office, Washington (1957). Although present day designs have certain structural refinements their basic structural components and the cooperations related thereto, are quite similar to that disclosed by Lallie. For example, all prior designs utilize switch operating elements in friction contact. However, by the application of the instant invention to modify a conventional current meter, switch operation friction is eliminated and new cooperative effects and substantially improved over-all operation for the meter are achieved.

An object of the present invention is to effectively eliminate frictional drag in the operation of the rotations sensing means of a current meter.

Another object of the invention is to provide a construction for a current meter in which an electrical rotations sensing means is not subject to low resistance complications due to moisture or exposure to the fluid being measured.

A further object of the invention is to provide for use as part of a current meter a rotations indicator control comprising electrical detecting means which may be field serviced without necessitating critical adjustments requiring new rating curve tests for the meter.

A still further object of the invention is a current meter of a sturdier construction having a longer operating life.

In order that the invention may be more clearly understood reference will now be made to the accompanying drawings which show by way of example a preferred embodiment thereof.

In the drawing:

FIG. 1 shows a plan view of the current meter partly in cross section to reveal details of construction;

FIG. 2 is a section through a part of FIG. 1, showing details of the contact chamber;

FIG. 3 is a section through FIG. 2, showing a part of the actuator magnet assembly;

FIG. 4 is a partial section of the switch assembly showing details thereof;

FIG. 5 is a schematic showing of the over-all circuit arrangement including the electrical elements of the current meter; and FIG. 6 shows the contact chamber cap with a portion of a modified magnetic actuator arrangement.

An assembled current meter as shown in FIG. 1, includes a yoke 1 having an extension 2, the end of which is drilled out to form a sleeve-like opening 3 by means of which a tailpiece 4 is connected to the yoke 1. The tailpiece 4 consists of two separate vanes 5 and 6 which, when assembled, are locked together at right angles to each other by means of a lever element 7. A stub nosepiece 8 which fits snugly into opening 3, and is secured by a setscrew 9, joins the yoke 1 and tailpiece 4 in accurate alignment. Short, heavy screw 10 is slidable in a slot 11 of vane 5 and may be adjusted and secured in a proper position to obtain a desired balance for the assembly. Two spaced parallel ear-like protrusions (one of which is shown), from the top of extension 2, each have a threaded hole 2' for receiving a hanger screw (not shown). The current meter is secured by this screw to an attaching element at the end of a long metal rod by means of which the meter may be lowered into a stream.

A bucket-wheel assembly 12, consists of six cone-shaped cups 13 (two of which are shown) soldered to a frame 14 to form a symmetrical and balanced assembly. The frame is centrally drilled and notched for a dowel pin (not shown), to receive and fix in position a bucket-wheel hub 15, as shown in FIG. 2. A nut 16 on a threaded portion of the hub 15, locks the bucket-wheel on the hub.

With reference to FIGS. 1 and 2, there are shown the yoke 1 and the bucket-wheel 12 joined by means of a shaft assembly 17, including the hub 15. In the assembly, a bearing 18 made of hardened tool steel, is pressed into a cylindrical recess in the lower end of the hub 15. A hole drilled in an arm 19 of yoke 1, has secured therein a pivot 20, also made of hardened tool steel, but less hard than bearing 18 in order to take the wear. Bearing 18 when seated on the pivot end of element 20, provides a rotatable support for the bucket-wheel assembly 12. The lower end of the pivot is threaded to provide for a nut 21 by means of which the clearance between the pivot point and the pivot bearing may be adjusted. A slightly tapered flat surface on the pivot above the threads serves as a contact surface for a pivot-keeper screw 22.

As shown in FIG. 2, the upper arm 23 of the yoke 1, is provided with a hole to receive a sleeve 24 formed from the bottom of a contact chamber 25 presently to be described, and a set screw 26 to secure the sleeve in position. A shaft 27 supported in sleeve 24, extends into the contact chamber 25, and is secured by means of a threaded connection 28 in a cylindrical recess in the upper end of the hub 15.

To lock the bucket-wheel in inoperative position, a threaded knurled sleeve 29 operable to turn on an external screw thread cut into the lower end of hub 15, is provided to contact an inside surface of yoke arm 19, and raise assemblies 12 and 17 such that the upper end of hub 15 abuts sleeve 24.

Cylindrical contact chamber 25 is provided with a matching cap 25' having a threaded portion which co-acts with an internal thread in the upper edge of the chamber to produce a tight seal. The horizontal connecting wall between the reduced diameter of sleeve 24 and the larger cylinder of the chamber proper, provides a surface for the chamber to rest upon the top surface of yoke arm 23. A threaded hole 30 through the wall in the upper half of the contact chamber 25, and a drilled depression 31 in an inside wall opposite the hole 30, provide means to secure into the contact chamber a switch assembly 32.

Referring to FIGS. 2 and 4, the switch assembly 32 is shown as comprising a switch container 33, an insulator insert 39, a threaded rod element 42, and a terminal thumbscrew 44 on a threaded rod portion 41. Switch container 33 which is made of non-magnetic material, has for the greatest part of its length, a small diameter elongated thin wall hollow portion 34, closed off at one end by wall 35. At its opposite end the container 33 is formed as a threaded collar 36 of a diameter larger than portion 34, and a thick head element 37 having a still larger diameter. Into the outer end of head 37, there is drilled, countersunk and threaded, a relatively large opening 38 communicating with the hollow of portion 34 and having a depth approximately equal to the thickness of the head. Half the length of elongated portion 34 starting at the collar 36, has cut into slightly less than half of its wall an elongated opening or window 33' for purposes to be described presently.

Insulator insert 39, which may be made of Teflon or the like, is formed with a cylindrical flange end 45, and a smaller diameter stub end 46 having a thread thereon. Through the center of insulator 39, is drilled and threaded a hole 39' having a diameter approximately equal to the diameter of the hollow of container portion 34. A small hole is drilled and threaded through the curved side wall of flange end 45, to receive a set screw 43, having a tapered end.

Threaded rod element 42, consists of a threaded terminal pin 41, a threaded rod 47 of slightly larger diameter, and a hexagonal flange 42' between the pin and rod. A small hole is drilled into the end face of rod 47 for approximately the length of this rod and a second small hole is drilled into about midway on the threaded portion of rod 47, to communicate at right angles with the end hole.

The heart of the switch assembly 32 is an electric switch 48, enclosed in a sealed insulating tube 49 which may be of glass or the like, and is preferably evacuated of air. This switch is of a type available commercially, such as obtainable from the Hamlin Company of Lake Mills, Wisconsin. Sealed through a hemispherical wall at the end of the tube is one of two cantilever electrically contacting elements 50 and 51. These elements each have a resilient flat portion 52 and 53 and a substantially rigid mounting portion 54 and 55. Contacting elements 50 and 51 are of high magnetic permeability and low retentivity, and each extends from its respective end of the tube to a position just beyond the tube center so that the free ends of the elements overlap. The wide flat portions 52 and 53 are directed toward one another so that when they bend at their resilient portions these surfaces will move toward or away from the opposite facing flat surface of the other element. Good electric contact between the overlapping ends may be assured even after repeated use by gold plating these ends. Circuit connections to the cantilever elements are made by means of stiff wire extensions 56, 57 of the elements protruding through the sealed ends of the tube 49.

To combine the structural parts of the switch assembly 32, the glass enclosed switch unit 48, 49 is inserted through opening 38 into container 33 such that wire 56 extends through a small hole drilled in end wall 35, and the flat sides of portions 52, 53 of the switch, face the window 33', with the overlap of the switch elements being positioned in the last third of the length of the window away from the collar 36. Rod element 42 and insulator 39 are joined by means of the threaded connection between the threaded rod 47 and hole 39' in the insulator. Flange 42' is tightened against the insulator 39, and the hole in the threaded part of rod 47 is aligned with the set screw hole in the insulator head 45. Insulator insert 39 is screwed into opening 38 of the container 33, such that switch wire extension 57 is inserted into the hole in the end face of rod 47. The switch assembly is completed by soldering wire 56 to container end 35, the end surface being finished smooth, and by screwing down on set screw 43 to pinch wire 57 against a surface in the hollow formed by the holes drilled in threaded rod 47.

Switch assembly 32 is operatively secured in the contact chamber 25, by inserting the switch container 33 into hole 30 of the contact chamber, and screwing collar 36 into hole 30 such that flat end 35 of the container fits snugly into the depression 31 of the contact chamber. With the switch assembly 32 in its correctly adjusted position, the window 33' of the switch container is found facing directly down into the contact chamber.

Located directly beneath the switch container 33, is a magnetic switch actuator assembly 58. Referring to FIGS. 2 and 3, it can be seen that the basic part of assembly 58 is a circular support 59 of non-magnetic material. The support is fastened by means of set screw 60, to a turned down end 61 of the shaft 27 extending up through sleeve 24, and into a hole drilled in the bottom center of the support. A bracket 62 soldered to the inside of the contact chamber provides a lateral bearing support for the shaft extension 61. Two short horizontal walls 63 and 64 extending from the upper face of support element 59, one on each side of a center line forms a track-like holding means for an actuator magnet 65, and an inertia balancing weight 66. Set screw 67 secures actuator magnet 65 in the track such that upon a rotation of support 59 an effective magnetic surface passes directly beneath overlapping switch contact parts 52 and 53. Weight 66 is positioned and secured by set screw 68, to counterbalance the inertia effect of the magnet weight during rotation.

Aside from actuator magnet 65, all parts of the magnetic switch actuator assembly 58 and the contact chamber 25, are made of a non-magnetic material such as chromium-plated brass.

Operation of the current meter is accomplished when the shaft 27 is continually rotated with the bucket-wheel assembly 12 by reason of the force of the stream acting against its cups 13, and switch actuator assembly 58 fixed to shaft end portion 61, rotates along therewith. Once each revolution the assembly 58 carries the actuator magnet 65 fastened thereto, past window 33' in the switch assembly 32, such that the full magnetic effect of actuator 65 passes directly beneath the resilient flat portions 52 and 53 of the switch contacting elements. The contacts are thereby positively pulled together, and then unhesitatingly separated by reason of their own resiliency. A circuit including the contacts, hereinafter described, is thereby made operative to produce a sharp pulse effective to operate an indicator mechanism, or sound a sharp click in earphones.

A more sensitive detection of the current velocity may be achieved by merely replacing balancing weight 66 with a second actuator magnet for the assembly 58. As a result each revolution of the shaft produces two sharp pulses for operating the indicator or earphones.

In a further modification the magnetic actuator includes two separate magnetic elements of different polarities, one of which is on the rotating support 59, as previously described in respect to magnet 65, and the other of which is fastened into the bottom, or interior side of contact chamber cap 25'. FIG. 6 shows a preferred construction wherein a magnetic actuator 85 is brazed into a depression on the bottom face of cap 25'. The actuator 85 is positioned on this face so as to be directly above the contact portions 52 and 53, when the cap is screwed down tight in the top opening of the contact chamber.

The magnetic strengths in each of the magnets 65 and 85 are such that although neither one alone will draw the flat portions 52 and 53 into surface contact, an alignment of the rotating magnetic element with these portions and the magnetic actuator 85, will cause such closure. The positive contact closing action effectuated by means of this cooperation permits an even greater accuracy in detecting each rotation of the bucket wheel assembly 12 moving at very high speeds.

The current meter measures the velocity of water flowing through a small section of a selected cross section of a stream. Discharge rate is usually expressed in cubic feet per second (one cubic foot per second is the quantity flowing through a cross section one square foot in area at a velocity of one foot per second), this is determined by dividing the total area of a cross section at the place of measurement into small or partial sections, and the area and the mean velocity of each is determined separately. The small sections are each bounded by the water surface, and the stream bed, and two imaginary vertical lines called verticals. Each vertical, therefore, being a common dimension for two adjoining sections, fixes the point at which observations of depth and velocity are made. Sufficient velocity observations are made to establish the mean velocity in each of two verticals forming the side boundaries of a section, and the velocities in the two verticals are then averaged to determine the mean velocity in the section. The product of the mean velocity thus obtained and the area of the section, which in turn is the product of the distance between the two verticals and the mean of their depths, is the discharge in the section. The sum of the discharges in all the partial sections is the discharge of the stream. The number of necessary verticals defining partial sections will depend upon the roughness of the stream bed and the variations in the velocities measured.

Measurement of velocity is made by observing the number of revolutions made by the rotating assemblies of the current meter over a period of 40 to 70 seconds (at velocities less than 1 foot per second, a longer run is usually taken), and by using a rating table for the current meter, the time and number of revolutions data is converted into velocity in feet per second.

Observations to determine the aforementioned number of revolutions may be made by means of a circuit arrangement as schematically shown in FIG. 5, comprising a battery 69, operating a visual indicator device 70 such as a flasher light or an electromagnetic counter, or earphones (in the manner disclosed in the patent to Lallie previously identified). At the observation location the circuit includes a series connection between a terminal 71 on the battery and a terminal 72 on the indicator device, or earphones. From the other terminal 73 on the battery an insulated wire 74 is extended down to the current meter in the stream to effect an electrical connection to contacting element 51 through terminal means 41, 42, and 44, and wire 57 of the switch assembly 32. From the other terminal 75 of the indicator or earphones an insulated wire 76 is electrically connected at 77 to the metal rod 78 used to suspend the meter in the stream by its attachment to the hanger screw in holes 2' in the top of the current meter extension 2. With the metal material of the meter yoke and contact chamber providing a good conductive link, the circuit arrangement is completed by a series connection in the switch assembly through its wall 35, wire 56, and switch contacting element 50.

It may be noted that with the use of the meter in a fluid such as water, there is an apparent short circuit between the terminal elements 41, 42, and 44, and the metal material of the meter proper. However, since current meters such as described are normally used in fresh water streams, an electrical current through such waters encounters sufficient electrical resistance to permit the operating circuit completed through closed contacting elements 50, 51, to be of significantly lower resistance. Consequently, the indicator device or earphones, and battery to be used in the circuit arrangement, are selected to have functioning characteristics whereby they are effective only in the operating circuit. It is also evident that when used in a fluid of high electrical conductivity the current meter may be easily protected against a terminal to metal frame (or ground), short circuit by covering terminal elements 41, 42, and 44 with an insulator cap.

Rating curves for individual meters are prepared based on runs made in a rating flume, wherein a meter is moved at different velocities through still water; a description of the required procedure and equipment may be found in the previously cited manual Stream-Gaging Procedure, pages 182–183. A rating curve is a plot of revolutions per second of the rotating part of the meter as the ordinate, and the selected velocity in feet per second as the abscissa. The rotating part of an ideal current meter in moving through still water would make the same number of revolutions for the same distance of travel, irrespective of the velocity. A rating curve for such a meter when plotted with revolutions per second and velocity in feet per second as the coordinates, would be represented by a straight line passing through the origin. In conventional modern meters, this relationship is only approximately true, as the effects of friction and slight imperfections in construction cause variations from the ideal rating, and it is found that the ratings are generally represented graphically by two or three connected straight lines having slightly different slopes, the lowest speed line crossing the abscissa at between .1 and .2 feet per second.

A rating curve for a current meter made in accordance with the present invention is invariably one straight line which crosses the abscissa at between 0 and .1 feet per second. The superior performance achieved is due to the elimination of the friction drag resulting from shaft gearing operating cam contact switch means in prior conventional current meters, and to the improved inertia balancing of rotating assemblies 12 and 58, made possible by the improved design of the present invention.

Replacement or adjustments of parts in contact chambers of current meters now in use, normally also requires that these meters be tested for new rating curves in order to insure reliable interpretation of meter readings. Since current meters of the present invention have straight line rating curves independent of friction effects associated with switch operation, parts in the switch assembly and contact chamber may be conveniently replaced without upsetting the original rating curve. This is of considerable importance when a current meter must be repaired in the field far from meter testing facilities.

In current meters now in use the cam operation of the switch contacts often produces unreliable signals. This is especially true at low velocities of the stream being measured. Friction drag on the cam, as well as the presence of particles of sand or dirt on the cam or contacts cause the electrical pulses to be of varying widths and to have indeterminate shapes of two or more peaks. On the other hand, in the present invention the operation of contact elements 50, 51, which are free from undesirable outside influences, have a positive make and break action. Consequently, they supply sharply defined electrical pulses of uniform configuration to the revolution count indicator. Moreover, the switch contact elements 50, 51, being sealed from the stream of fluid and its vapors, are free from corrosion, and accordingly have a longer operating life.

While I have shown and described a specific apparatus for use in practicing my invention other modifications will be readily apparent to those skilled in the art.

I claim:

1. A current meter for measuring the velocity of fluid flow having in combination a vane assembly for directional control, and a rotatable bucket-wheel means responsive to the force of the fluid flow and operative to drive a shaft connected thereto, a magnetically controlled rotation detecting arrangement comprising an enclosed structure forming a chamber having a cap means sealing the top thereof, and an opening at its bottom providing a bearing for an end of the said shaft extending into the chamber, a switch assembly supported in aligned openings in the upper part of the chamber walls, a portion of the assembly spanning the full width of the chamber, said portion being a container having a cut out section forming a window facing the bottom of the chamber, said container having secured therein a tubular envelope having within switch contacts, said switch contacts comprising electrically conducting resilient flexible overlapping reeds of magnetic material adapted to contact each other, said envelope being positioned in the container to present the flat sides of the reeds to the opening in the container; a switch actuator assembly fastened to said shaft end in the chamber and rotatable therewith, said assembly comprising magnet means operative when the assembly continually rotates to repeatedly pass directly beneath the opening in the container to thereby draw the overlapping reeds into firm surface contact, and then permit the reeds to quickly separate by reason of their resiliency.

2. In a current meter for measuring the velocity of fluid flow, a contact chamber having means rotatably driven by said fluid flow, an electrical switch assembly comprising a primary element formed as an elongated hollow container of non-magnetic material closed at one end and having a cut-out portion, and extended from its opposite end a collar and head portion having an opening in an outer face thereof communicating with the hollow container, an intermediate element of electrical insulation material having head and stub parts, and a tapped hole through both parts and a hole in the head part at a right angle to and communicating with the said tapped hole, a terminal element having a threaded portion and a longitudinal hole in said threaded portion and a hole through the threads at right angle to the said longitudinal hole and communicating therewith, the threaded portion being screwed into the tapped hole in the intermediate element whereby the holes at right angles are aligned, a switch contact means having two contact elements respectively connected to two leads, said contacting elements being positioned in said container to face the cut-out portion thereof, and one lead is conductively connected to the closed end of the container, and the second lead being conductively connected in the said longitudinal hole by securing the stud part of the intermediate element in the opening in the head portion of the container, and fastening the second lead by a means operative in the aligned right angle holes, the contact chamber having the switch assembly secured thereto by means of the collar of said primary element whereby said means rotatably driven is operative to actuate the switch contact means.

3. In a current meter for measuring the velocity of fluid flow, the electrical switch assembly of claim 1, wherein the cut-out portion of the elongated hollow container is an opening parallel to a longitudinal axis thereof.

4. In a current meter for measuring the velocity of fluid flow, the electrical switch assembly of claim 2, the switch contact means being enclosed in an hermetically sealed envelope.

5. In a current meter for measuring the velocity of fluid flow, the electrical switch assembly of claim 2, wherein the cut-out portion of the elongated hollow container is an opening parallel to a longitudinal axis thereof, and the switch contact means being enclosed in an hermetically sealed envelope.

6. A contact switch assembly comprising a switch receptacle, an insulator insert, a terminal unit, and a contact switch, the receptacle being formed as a hollow elongated tube of non-magnetic material closed at one end and having formed as an extension from the other end a threaded collar, and a cylindrical portion having a first tapped hole opening in an outer end surface and communicating with the hollow in the tube, the tube having a window cut out in half the length of its elongated surface, the insulator insert comprising a threaded stub portion integral with a cylindrical cap portion, a second tapped hole formed completely through both portions and a smaller tapped hole in the cylindrical wall of the cap portion communicating with the second tapped hole, and having a set screw coacting therein, the terminal unit being formed with a threaded rod and a threaded terminal stem having a fastening means thereon, the rod having a longitudinal hole extending from an end face thereof and a second hole extending from its threaded surface at a right angle to and communicating with the hole in the end face, the contact switch comprising two flexible reed electrical contacts of high magnetic permeability and low retentivity hermetically sealed in an envelope of non-magnetic, insulator material, two conductive leads, one from each of the reeds extending out through the envelope, the threaded stub being secured in the first tapped hole, and the threaded rod being secured in the second tapped hole such that the smaller tapped hole in the cap and the hole at a right angle in the rod are aligned, the contact switch being positioned in the receptacle such that the reeds face the window cut out, one conductive lead is attached in the closed end of the receptacle, and the other conductive lead is received in the hole through the end face of the rod, the set screw being operative in the aligned holes to fasten the said other lead in the rod.

7. A contact switch assembly comprising a switch receptacle of non-magnetic material, containing a switch means comprising a hermetically sealed envelope, said receptacle being closed at one end by a wall, and at its other end by an insulator plug having secured therein an electrical terminal unit, the sealed envelope of the switch means containing resilient electrical contact elements of magnetic material normally spaced apart and subject to contact closure in the presence of a field of magnetic lines of force, the respective elements of the switch means being conductively connected through said sealed envelope to the said receptacle wall and to the terminal unit.

8. A contact switch assembly as defined in claim 7, wherein an opening in the switch receptacle provides a window with which the magnetic electrical contact elements are aligned.

9. An electric switch arrangement including a switch chamber of wall surfaces and a cap means forming an enclosure having therein a contact switch assembly and a switch actuating assembly, said switch assembly comprising a hollow elongated container having at one end a wall of conductive material and the other end comprising an insulating plug, openings in the wall surfaces of the switch chamber in which are received the said end wall and plug to support the container in the chamber, normally open, flexible switch contacting elements of magnetic material operably supported in the container, said actuating assembly comprising a support fixed to a shaft and rotatable therewith, and a magnetic actuator means secured on said support such that upon rotation of the support and the means thereon, the magnetic flux from the latter passes through the magnetic contacting elements causing them to close, and then permitting them to flex open as the flux is moved beyond the contact elements.

10. An electric switch arrangement as in claim 9, wherein the actuating assembly comprises on said support, a track passing through an axis of rotation defined by the rotating support and shaft, said magnetic actuator means being secured in said track.

11. An electric switch arrangement as in claim 10, wherein the magnetic actuator means comprises two magnetic elements, evenly spaced in said track, from the axis of rotation.

References Cited in the file of this patent

UNITED STATES PATENTS

| | | |
|---|---|---|
| 1,571,433 | Price | Feb. 2, 1926 |
| 2,600,309 | MacDonald | June 10, 1952 |
| 2,649,712 | Dale | Aug. 25, 1953 |
| 2,915,606 | Knauth | Dec. 1, 1959 |
| 2,932,703 | Haberland | Apr. 12, 1960 |